United States Patent [19]

Vanourek et al.

[11] Patent Number: 4,949,272
[45] Date of Patent: Aug. 14, 1990

[54] FLEXIBLE BILLING RATE FOR MAIL COMMUNICATION SYSTEMS

[75] Inventors: Robert A. Vanourek, New Canaan; Joseph W. Wall, Monroe, both of Conn.

[73] Assignee: Pitney Bowes Inc., Stamford, Conn.

[21] Appl. No.: 285,904

[22] Filed: Dec. 16, 1988

[51] Int. Cl.$^5$ ................ H04M 11/08; G07B 17/00
[52] U.S. Cl. ............. 364/464.02; 340/870.02; 340/870.03; 364/464.04; 379/107
[58] Field of Search .......... 340/870.02, 870.03, 340/825.35; 364/464.01, 464.02, 464.03, 464.04; 379/106, 107

[56] References Cited

U.S. PATENT DOCUMENTS

| | | | |
|---|---|---|---|
| 4,097,923 | 6/1978 | Eckert, Jr. et al. | 364/900 |
| 4,291,375 | 9/1981 | Wolf | 364/464.04 X |
| 4,513,382 | 4/1985 | Faulkner, Jr. | 364/492 |
| 4,713,761 | 12/1987 | Sharpe et al. | 340/825.35 X |
| 4,713,837 | 12/1987 | Gordon | 379/107 X |
| 4,752,950 | 6/1988 | Le Carpentier | 379/106 |
| 4,803,632 | 2/1989 | Frew et al. | 340/870.02 X |
| 4,812,965 | 3/1989 | Taylor | 379/107 X |
| 4,833,618 | 5/1989 | Verma et al. | 379/107 X |

Primary Examiner—Parshotam S. Lall
Assistant Examiner—Edward R. Cosimano
Attorney, Agent, or Firm—Robert Whisker; Melvin J. Scolnick; David E. Pitnick

[57] ABSTRACT

A communication system for processing information for distribution, including: a central data station, a plurality of user stations, a communication link interconnecting the user stations with the central data station, each the user stations including means for accessing the central station, the central station including a data base of usage information and billing data, the central station including means for accessing the user station usage data base, the central data station including means responsive to the user usage pattern for calculating a billing data means for transmitting the billing data to the station, the billing data including a billing plan based upon the usage information of the user and the projected usage calculated from the central station data base in accordance with the user data base.

13 Claims, 5 Drawing Sheets

FLEXIBLE BILLING RATE FOR MAIL COMMUNICATION SYSTEMS

BACKGROUND OF THE INVENTION

This invention relates to mail processing, and specifically to improvements in mail processing systems, which will relieve central postage facilities of certain mail handling tasks.

The United States currently has the world's largest postal system. The U.S. Post Offices currently handle in excess of 100 billion pieces of mail per year, about half the total volume handled throughout the world. The servicing of mail delivery involves three essential steps; collection, sorting and delivery. Collection takes place through a series of post offices spread throughout the United States. The United States has about 30,000 post offices that provide mail services in addition to 9,000 smaller postal centers which provide some kind of some type of mail service. Postal employees typically take letters and packages from mail box facilities to the nearest local office where it is accumulated for the sorting procedure. At the post office, postal clerks remove collected mail from sacks, bundle packages and segregate mail by size and class into separate categories. The mail travels by truck from local post offices to a central facility known as a sectional center. The United States has 264 sectional centers, some of which serve hundreds of local post offices. The sectional center processes nearly all the mail coming or going from its region. At the sectional center, high speed automated equipment sorts large volumes of mail. The postal service currently uses two sorting systems. One system is devoted to letters and other first class mail, and the other system, for bulk mailing, is used to sort packages, magazines advertising, circulars and other large mails. The letter sorter process involves manually moving mail sacks onto moving conveyor belts, which carry the mail to a machine called an edger-feeder which sorts it according to envelope size. The postal service regulates the size of envelopes to make such mechanical sorting easier. The edger-feeder feeds the letters into another machine known as a facer-canceller. Sensing devices of the facer-canceller determine where the stamp is located on the envelope, and enable the machine to arrange the letters so that they all face in the same direction. The cancelling portion of the mechanism then cancels the stamp by printing black lines and the like over it so that it cannot be used again. The machine also prints a postmark on the envelope, including the date, the name of the sectional center, an abbreviation for the state and a three, four or five-number zip code. In addition, the postmark records the time period during which the letter was received at the post office. A computerized machine known as a zip mail translator sorts the postmarked letters according to the their destination post office. Postal workers selectively activate the machine's keyboard to send each letter on a conveyor belt into one of hundreds of bins. Each bin holds mail for a different post office. Mail addressed to locations outside the regions served by the sectional center are transported by truck, airplane or train to other sectional centers for further sorting. Finally, postal clerks hand sort mail for the area served by the sectional center into bundles for each delivery route. The zip mail translators in some postal areas have been replaced by more advanced computerized machines called optical character readers which read the zip code on the letter, and pass the mail to another machine that places a series of marks known as bar codes onto the envelope. Additional mechanisms read the bar code and sort mail according to the regions indicated by said bar code. Mail addressed to locations within the regions served by the section center is sorted again by other bar code readers according to destination post office and then according to delivery route. An expanded nine-number zip code, chiefly for use by high-volume mailers, enables the post office to substantially reduce some of these essential time consuming and extensive sorting services. The same processes apply to sorting bulk mail. Current estimates indicate that the foregoing processing tasks necessarily involve in excess of half a million employees. Cost of maintaining and supporting sorting services at the central post office facilities, even including large scale use of automated equipment, has become staggering. Projections of substantial increases in volumes of mail being transporting through central facilities, even with the advent of private delivery, telecommunications services, facsimile services and the like indicate that a rapid expansion will be required of such facilities. Since the postal service is a private corporation and is expected to become self-supporting, rapidly advancing postal rates place greater and greater burdens on both users and the postal service in order to support such volumes of mail. In recognition of capabilities of certain high volume users to provide services to central postal facilities, which services may improve efficiency and reduce the amount of processing time required by the central serving facilities, the US Postal Service offers substantial reductions in rates, provided that a user comply with certain requirements which will allow the U.S. Postal Service to take advantage of certain user-provided facilities to reduce its own work load. The concept of work sharing, wherein a user provides certain of the processing activities prior to delivering the mail to the central postal facilities has been proposed and is therefore a positive innovation in the field of mail processing which may have a substantial impact in the future implementation of mail services.

However, placing a burden on the user to provide certain of the facilities and services which the U.S. central post office facilities now provide is an equally heavy burden for the user, and must be done in a manner which permits the user to realize substantial savings with its own increased work load by taking advantage of the reduced postal service rates while not exceeding the reduction in rates by the serving costs of providing such services on its own.

The Postal Service has already recognized the ability of users to preprocess certain kinds of mail and will accept mail in bulk delivered from a processor along with certification that its procedures have been complied with, and will accept such certification as prima facia justification for reduction in postal service rates. Thus, for example, manifest systems, wherein a manifest is provided to the central post office representative of a group of documents preprocessed by the user, are already known and do allow the user to realize a substantial reduction in rate. However, a large number of additional services, aside from manifesting services, may also be provided by the user and accepted as such by the central processing facility of the postal service in exchange for rate reductions. These additional services, however, require interface communications between the central service and the user so as to maintain within the user's facility information regarding internal postal procedures, such as rates, volume, quantity discounts and the like in order for the central post office facility to accept as valid certification by the user that certain procedures mandated by the Postal Service have been complied with. The automation of such processing, through the use of telephone or other data communication links, is essential to the successful operation of such a system.

It is therefore the principal object of the present invention to provide a system and apparatus within a user facility which will both operate and maintain, in current fashion, certain preprocessing facilities which can be certified and accepted as properly performed via such certification by the central processing facilities of the U.S. Postal Service in order to qualify for substantial reductions in rate by the use of bidirectional communication links, and in so doing to utilize the communication link to augment and update data base facilities at the user and base stations so that facilitation of user limited facilities may be expanded beyond the user capacity by interaction with the larger central station.

Prior systems relating to work share features are discussed in copending application Ser. No. 285,146 and 237,977 filed Dec. 16, 1988, and Aug. 23, 1988, respectively and assigned to the assignee of the present invention, and U.S. Pat. No. 4,713,761, also assigned to the assignee of the present invention. The applications relate to the concept of using certain limited user provided services but do not encompass the full range of work sharing and data sharing services concepts presented herein. The U.S. Pat. relates to accounting and billing and does not solve the problem of relieving the postal service of substantial service burdens in an effective manner.

SUMMARY OF THE INVENTION

The present invention relates to a method and apparatus for work sharing including information sharing between participants as well as self-contained automated processing facilities relative to specific requirements set forth by the Postal Service along with certification of compliance with such requirements acceptable to the Postal Service.

Specific certification requirements include analysis by the user of mail composition, currently known as 3602 Information, in accordance with the specific form currently employed by the post office facilities for such information, such composition including weight, volume, classifications, carrier route information, zip code, appropriate bar code, designations, and rate. In addition, other services such as extended present coding addressing, accuracy of presorts classification of mailpiece type for machine readability, accuracy of weight and volume in accordance with predesignated discount rates set by the Postal Service in accordance with such factors, and ultimately payment and billing, are all facilities which may be incorporated within a user facility. Incorporation of such information within a user facility, coupled with intercommunication capability between such user facility and a central postal facility, gives certain additional advantages to both user and postal facility which are inherent in the nature of information processing. Thus the user facility may keep track for accounting purposes of its mailing and other processing as well as funding and volume uses, while the Postal Service may employ intercommunication with many of these user units to forecast workloads, transportation requirements, the management of asset inventory, the creation of mailer profiles, and other information which may be employable to establish process controlling to better manage the U.S. Postal Service resources. In addition, by making certain requirements of the user equipment, the requirement of range of operation of the central service facility equipment may be substantially narrowed. Thus, common fonts may be provided through user equipment which will reduce the requirement of central service facilities to have multiple font capability in optical character recognition.

The maintenance of a two-way communication link between the central station and each of the user facilities permits the central station to keep a permanent record, available for inspection by the U.S. Postal Service, and which may be employed to confirm uses of any of the local users by cross-check, of each of the elements of data which will be considered essential to any specific user application. Thus, each of the user applications are also designed to apply postage, central accounting and data facilities may be employed to keep track of each users postage requirements. This may also employ two-way charging and recharging of local postage meters from the central station, also under authority from the US Postal Service, and as have been previously disclosed in prior art remote recharging systems currently in use. Thus, during the on-line periods, multiple quantities of data may be exchanged between the central station and the local user. Thus, the present invention also provides in one embodiment for the employment of a central station with multiple processing ability, capable of high speed data interchange between pluralities of remote local units and itself, and possessing the further capability internally of correlating data culled from each of the remote users which may be employed both for statistical purposes and for the purposes of moderating usage by each of the local users and for insuring compliance with the latest U.S. Postal Service rules, regulations and certification procedures for work sharing.

The data center billing/ordering system is interlinked with the user to allow a selection of sale rental lease, service charge, click fee charges, reset/usage fee charges or supply charges. The user and a data center sales representative interactively access a comprehensive billing system data base. The billing system data base, which incorporates live data used by the data center to generate its actual invoices, is utilized to configure a billing plan for a potential customer based upon his needs and financial situation. The billing can be a combination of sale, rental and click charges or service fees, resetting fees and sales, etc. The system can also be linked to external credit and the data center to enable leasing of capital equipment. The invention includes the modifying of the billing arrangement with time either due to changed financial conditions of the customer or because of the addition of services and equipment. Communication by data link is used in conjunction with real time communication to insure proper satisfaction of the customer needs. Communication in contrast may also be by means of a code or other form with the relevant information transmitted in encrypted format. The information may be scanned and used to automatically set the postal equipment at the user site to proper settings, both for pastage and for usage scheduling, without direct user intervention, thus enhancing security and efficiency.

DESCRIPTION OF THE DRAWINGS

The foregoing brief description and summary of the invention will become more apparent from the following more detailed description of the invention, accompanied by the attached figures, wherein.

DETAILED DESCRIPTION OF THE INVENTION

Figure 1:
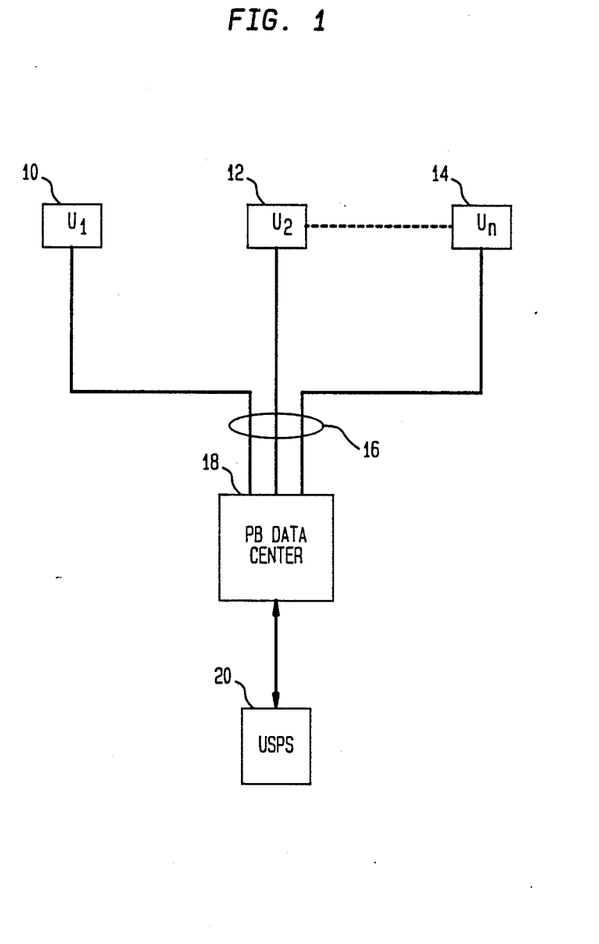
FIG. 1 is a functional block diagram illustrating the relationship between the data center, the U.S. Postal Service, and the local users.

With reference to FIG. 1 plurality of user stations designated as $U_1, U_2 \ldots U_n$, and identified as 10, 12 and 14 are shown. It will be understood that multiple user stations are possible in excess of the three shown, and that these are shown by way of example only. These stations are coupled by means of an interconnection network, illustrated generally at 16, to the data center 18, which in turn may be appropriately coupled by means of a secure line or the like to the U.S. Postal Service 20. The data center is a facility run by a commercial operation, such as Pitney Bowes, Inc., the assignee of the present invention. Each of the blocks 10, 12, 14, 18 and 20 contemplate the use of data processing components, each appropriately interlinked by means of high speed telecommunication links or the like for the purposes of exchanging information. It is also contemplated within the scope of the invention that the US Postal Service will maintain an appropriate computer facility, not otherwise described herein, which will possess the capability of uploading and downloading specific pieces of information upon request by the data center, and relating to appropriate postal rules and regulations which will effect the use of certain discounts in mailing postal rates, as well as other factors necessary for the concept of shared work services which will be certified by each of the individual user stations in order to qualify for reduced rate requirements when mail is received in the U.S. Postal Service facilities. The communication link is also contemplated as a two-way link between units 18 and 20, wherein the U.S. Postal Service will have the capability of monitoring specific operations within the data center in order to ensure that the data center is operational in accordance with rules and requirements which may be imposed by the Postal Service from time to time. The monitoring operation is a periodic unscheduled communication link examination of certain storage areas of accessed memory locations for confirming proper operations. Of course, visual on site inspections and examinations may also be made.

Figure 2:
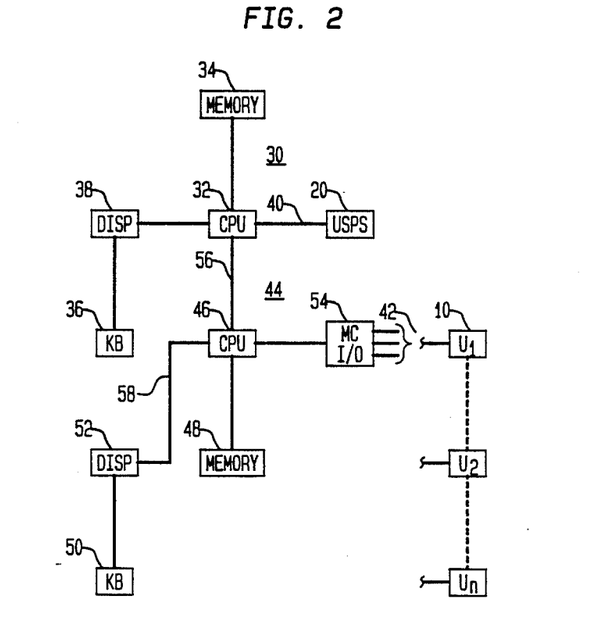
FIG. 2 is a more detailed block diagram illustrating a data center.

With reference to FIG. 2, a more detailed functional component relationship of the data center is illustrated. Thus, the data center includes a first data channel 30 which includes a CPU 32 having a program memory 34, a keyboard 36 and an appropriate display 38 coupled thereto. Data communication link 40 interconnects CPU 32 to the US Postal Service 20. The user units 10 are coupled via appropriate telecommunication data links 42 to a second data channel 44 which includes a CPU 46, a program memory 48, a keyboard 50 and an appropriate display 52. The CPU is coupled to the data links 42 by means of a multi-channel I/O device 54 capable of high speed data communication In operation, two-way communication between the data channel 30 and the U.S. Postal Service 20 provides a continuous interchange of information regarding updates of U.S. Postal Service rules and regulations required for the continuous certification use by the local users 10. In addition the data channel 30 may also be manually interrogated by means of keyboard 36 for inquiring of the Postal Service for specific information which may be employed with regard to compliance with certifications, the answering of specific data questions, or other uses requiring specific interrogation by means of the central station to the U.S. Postal Service. Since the U.S. Postal Service link is a two-way communication over channel line 40, it is possible through this link for the U.S. Postal Service to interrogate and monitor the operation of the first data channel 30 and the second data channel 44, for compliance with quality control and other security compliances which may be required by the U.S. Postal Service.

Turning now to the second data channel 44, high speed continuous two-way with respect to continuous update of U.S. Postal Service requirements for certification, servicing and diagnostics, training, and other information interchange, are effected by means of the CPU 46 operating through the high speed data channel 54 interfaced with communication lines 42 to the multiple user network U1, U2 ... Un. Operating under control of the program memory 48, the CPU 44 is contemplated as a high speed multiple processing information apparatus of conventional design such an IBM 3083 or a DCVAX unit which may handle multiple requests from any one or more of the users simultaneously through the multiple channel I/O device. Keyboard 50 and display 52 may be utilized for manual information interchange between any of the local users and the information operator. Although only a single keyboard display unit is illustrated, it will be understood that dataline 58 is a schematic representation of the existence of a multiple number of display keyboard combinations evidencing the use at the central station of a plurality of key operators available to answer user questions upon interrogation.

Figure 3:
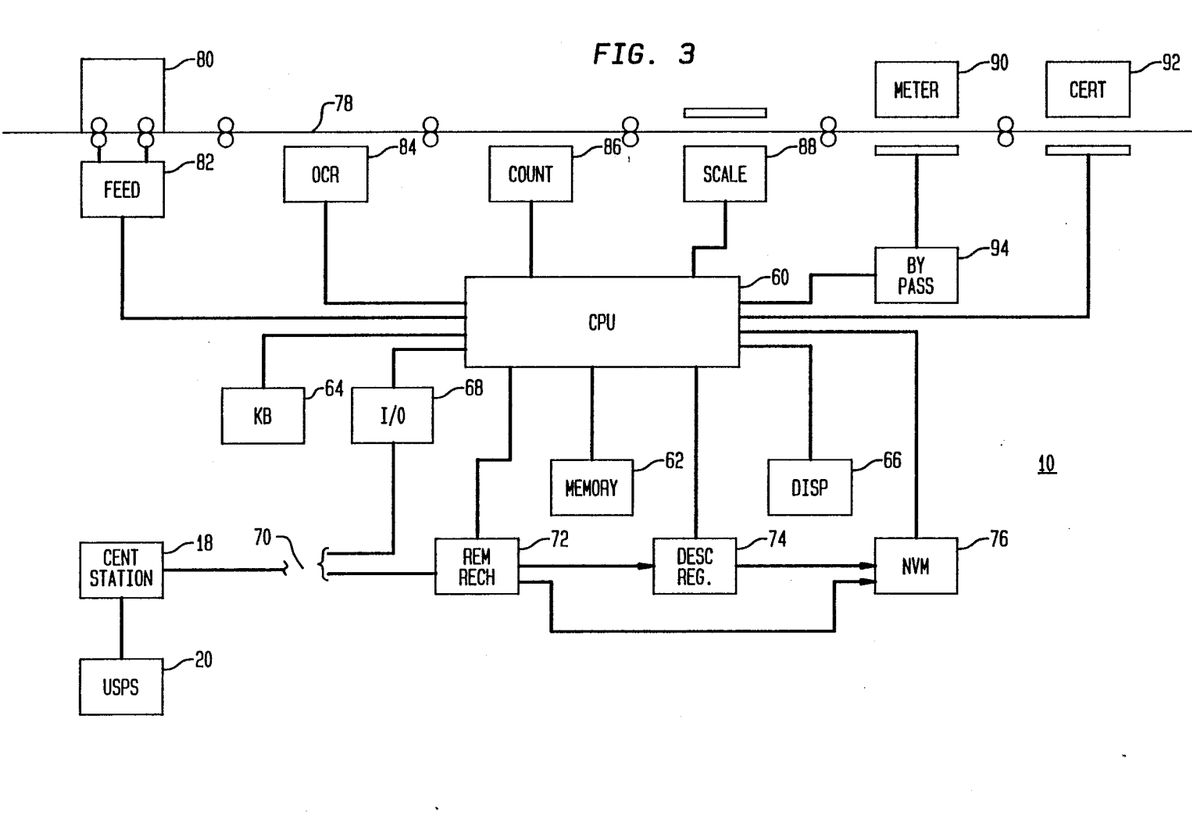
FIG. 3 is a more detailed block diagram illustrating a user station.

Referring to FIG. 3, the function block diagram illustrating the interrelationship of components within each individual user station is illustrated. The central user station operates under the control of a CPU 60, which includes a RAM memory and appropriate control registers. Coupled to the CPU 60 is a program memory 62 which defines the essential function of the system, including updating instructions and rates used in the local user units, diagnostic monitoring, a two-way communication link establishing a tracking facility utilizing the encryptic key represented by the certification, and interface capabilities with respect to the central station for the downloading of training information which enables operators at local stations to understand and comply with specific requirements imposed by the U.S. Postal Service with respect to the certification process. Coupled to the CPU 60 are a keyboard 64 for the manual entry of data requests and other information into the CPU, display unit 66 and an I/O channel 68 coupled by means of a data link 70 to the central station 18. Accounting information and funding to the local user 10 is effecting through the data link 70 from the central station 18 to the remote recharger mechanism 72, operating in accordance with conventional recharging techniques, such as is disclosed in U.S. Pat. No. 4,097,923 issued to Eckert, Jr. et al. and assigned to the assignee of the present application. Remote recharging unit 72 charges a descending register 74, in conventional manner, which keeps track of descending balances charged from time to time in accordance with mail requirements. Non-volatile memory unit 76 is employed to maintain security of information during periods of time when local user unit 10 is not operating. Nonvolatile memory 76 receives descending register balances as part of a shutdown routine, along with other security data which may be applied from the active memory of the CPU 60. One of the features of the central unit 10 is that the remote recharging operation carried on in remote recharging circuit 72 is maintained through the data link 70 to the central station 18, and operates independently of the OFF/ON status of the local user unit 10 for monitoring purposes. Thus, even if the local unit 10 is turned off, central station 18 through data link 70 may inquire through the remote recharging unit of the status of certain pieces of information which are maintained either in the RAM memory portion of the CPU 60 during on-times of the unit 10 or in the nonvolatile memory 76 during inactive status periods.

The concepts of work sharing entail the performance of certain postal service functions by the user i n a secure manner so as to enable the user to apply not only postage but to also apply certification, as an imprint on the mail piece, which will be accepted by the postal as indicating service that the services certified were in fact performed by the user and thus enable the user to be entitled to further mail rate reductions. Communication in contrast may also be by means of a code or other form with the relevant information transmitted in encrypted format. The information may be scanned and used to automatically set the postal equipment at the user site to proper settings, both for postage and for usage scheduling, without direct user intervention, thus enhancing security and efficiency.

Certification information is provided to the CPU through a plurality of inputs along a mail path designated as 78. Mailpiece documents which are stacked in appropriate feeder-stacker unit 80 are, under control of CPU 60 through feeder-unit 82, driven along the mail path 78, past OCR unit 84 where printed material on t he mailpiece is read, past counter station 86 where individual pieces are counted, to the scale unit 88 where the mailpiece is weighed, and thence to a metering station 90 for application of appropriate postage and finally to a certification station 92 where appropriate certification stamps may be placed on the mailpiece to indicate compliance of the mailpiece with all the criteria that have been set under work sharing requirements required under the U.S. Postal Service regulations. Since the unit may be capable of handling prefranked mail, a meter bypass network 94 operating under control of the CPU, provides for bypassing of the mailpiece of the metering station 90 without the necessary application of additional postage. Problems encountered in short-weight mail may be adjusted by appropriate decrement of the descending register balance in descending register 74 under program control through CPU 60, based upon differences detected by the computer between applicable postage rate requirements and the actual mail run being passed through the user station 10. An example of short-weight mail is disclosed in copending application Ser. No. 285,146, filed concurrently herewith, and assigned to the assignee of the present application.

The data center billing/ordering system is interlinked With the user to allow a selection of sale, rental, lease, service charge, click fee charges, reset/usage fee charges or supply charges. The user and a data center sales representative interactively access a comprehensive billing system data base. The billing system data base, which incorporates live data used by the data center to generate its actual invoices, is utilized to configure a billing plan for a potential customer based upon his needs and financial situation. The billing can be a combination of sale, rental and click charges or service fees, resetting fees and sales, etc. The system can also be linked to external credit and the data center to enable leasing of capital equipment. The invention includes the modifying of the billing arrangement with time either due to changed financial conditions of the customer or because of the addition of services and equipment. Communication by data link is used in conjunction with real time communication to insure proper satisfaction of the customer needs.

Figure 4A:
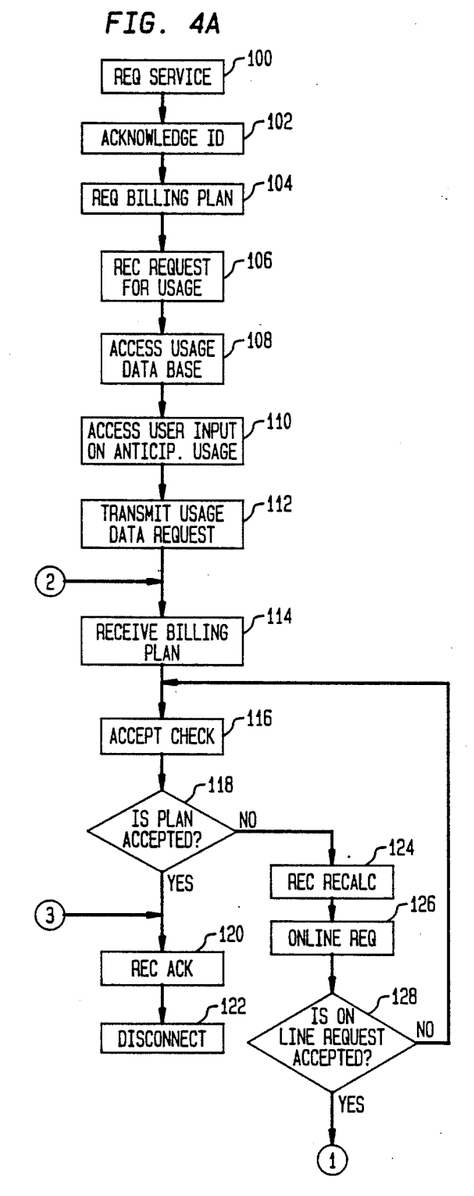
FIG. 4a, 4b, 5a and 5b are flow charts illustrating the operation of FIGS. 2 and 3.
Figure 4B:
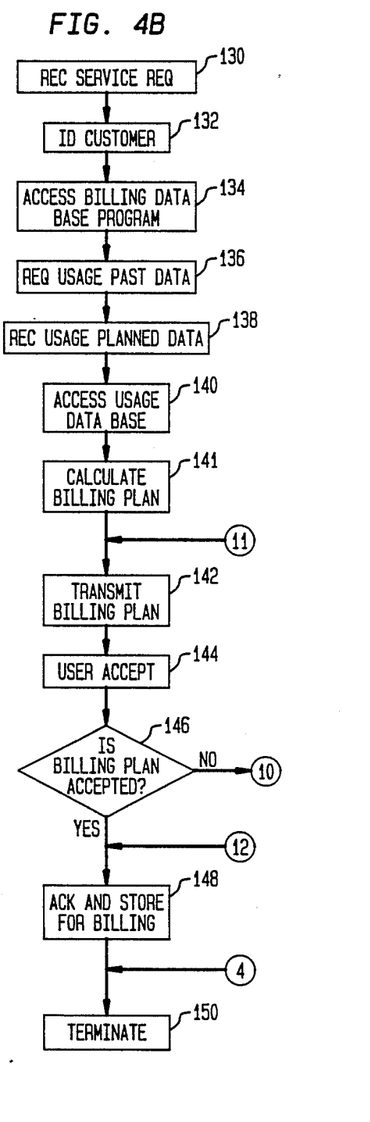
Figure 5A:
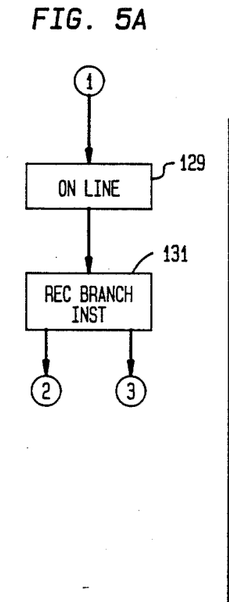

Referring to FIG. 4a and 4b, flow charts illustrating the operation of the foregoing described sequence are set forth. FIG. 4a illustrates the program setting forth the flow in the user central processor whereas FIG. 4b sets forth the programming flow in the central data unit. The flow charts are arranged in parallel format so as to facilitate ease of understanding of the relationships between the two flow charts based upon communications between the user and the central data unit. Referring first to FIG. 4a, the implementation first begins with a request for service initiated 100 by the user over the data link. The service request will involve the transmission of an identification number or code from the user unit which will be analyzed and authenticated by the data center. Upon receipt of an acknowledgment signal 102, the user then initiates a request for a billing plan 104. In response, the data center processes such a request and in response transmits back a request for usage 106 to the user unit. The user unit then accesses its usage data base 108 and next accesses its user input on anticipated usage 110 over a future time period. This data is then transmitted to the central unit 112 where it is processed by the central unit and in response the central unit transmits back a billing plan 114 which is received in the user unit 116. The user may accept the billing plan 118 and as indicated in the decision block by a Y output, if acceptance is affirmed, the same is transmitted back to the central data unit, which is then received and acknowledged 120 by the user unit and the user unit is then disconnected. 122. However, if the user does not accept the proposed billing plan, indicated by the N branch on the decision block after acceptance check, the data center recalculates the billing plan 124 and retransmits it back t o the user unit where it is received by the user 126. Next, the user is allowed an online request option 128, allowing the user to interface directly with the data center. If the user does not accept the online request, indicated by the No line on the decision block following the on line request block 128, the receiving unit at the user station recycles through the acceptance procedure and the cycles noted before hereinabove are repeated. If the user accepts the on line request, indicated by the Y output line of the decision block following the on line request block, t he program continuing to FIG. 5a, indicated by branch line 1, next goes on line 129 and several options are then presented to the user. The on line option allows for direct communication 131 as by live voice communication with the data center, the end of which provides two options to the user. The first option, indicated by branch point 2, causes the user unit to branch back to the receive billing plan step on the presumption that the intercommunication between the user and the data center has resulted in a new billing plan which will be presumably acceptable to the user. Alternatively, a nonacceptance or non-completion of the billing program will branch the point 3, which is shown in FIG. 4a, will result ultimately in a disconnect.

Figure 5B:
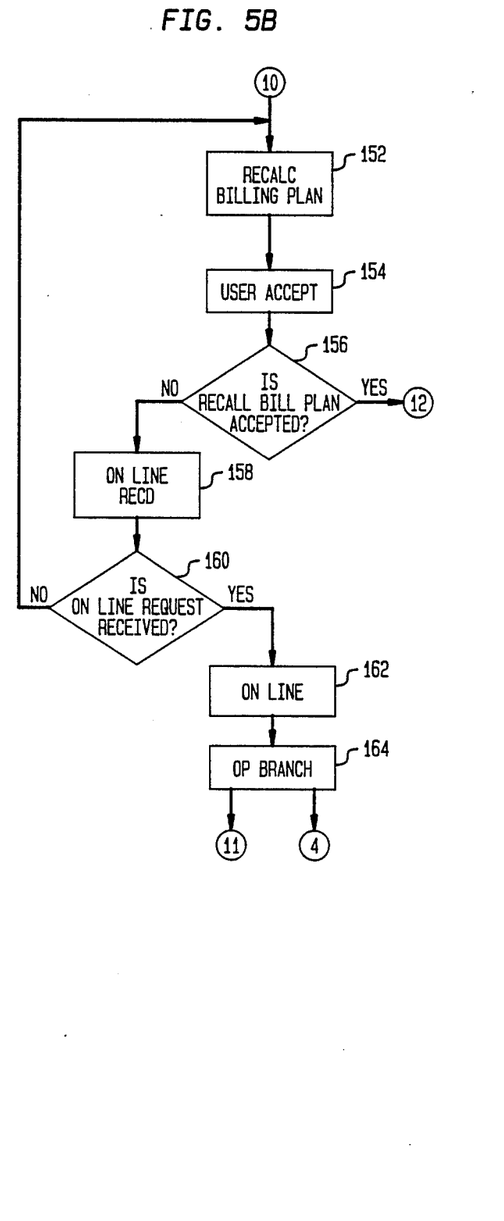

Referring to FIG. 4b, the operation of the data center will be illustrated in some detail. First, the data center receives a service request 130 over a transmission line. The customer is identified 132 and the data center accesses the billing data base program 134. Next, the data center requests the usage data from the user unit 136, and then requests the planned usage data 138 which is to be the subject of the billing program. The data center then accesses its own data base 140, which data base incorporates the data actually used by the data center to generate its actual invoices in order to configure a billing plan for the customer based upon need and financial situation. The data center, based upon all of the foregoing considerations, then calculates the billing plan 141 and transmits the billing plan to the user 142. The response by the user in the user acceptance block 144 as indicated in the following decision block 146 is either a yes or a no. In the event that the user accepts the billing plan, the data center acknowledges the acceptance and stores the billing plan 148 in its own memory for later actual billing to the customer based upon such billing plan, and then terminates the connection 150. In the event the customer does not accept the billing plan, the program branches through branch point 10, to FIG. 5b wherein the program then recalculates a billing plan 152 and transmits the recalculated billing plan for acceptance 154 as indicated in the following decision block 156. If the user again does not accept the billing plan, the data center awaits an on line request. If an on line request 158 if not received, the program branches back to the recalculation and the data center again recalculates the billing plan for proposed user acceptance. If an on line request is made, then according to decision block 160 following the on line request 158, the on line operation occurs 162 allowing for a live interaction between the data center and the user. At termination of this procedure, the user is offered two options 164, as was explained in conjunction with FIG. 5a. If the user accepts option 11, the data center branches back to retransmission of the billing plan and the cycle repeats. If the user accepts option 4, the transaction is terminated and the user disconnected. If there is user acceptance of the recalculation, indicated by the Y branch of the decision block following user acceptance, the program branches through point 12, to FIG. 4b, where the recalculated billing plan is stored for billing and the call then terminated.

Although not set forth in detail in the foregoing flow chart it will be apparent that variations in the on line requests and the number of recalculation plans submitted automatically to the user may be varied in accordance with specific user requirements. It will also be understood that the user may interact directly with the data center without the necessity for on line transmission by virtue of his keyboard unit at the user station which will allow the user to request different billing formats, such as lower monthly payments or longer credit terms, or other billing options which may be available in accordance with data center transmissions. These may be automatically displayed on a screen utilizing menu formats allowing the user to step through various menu selections and may be utilized by the data center for the purpose of recalculating billing programs based upon such user input requirements.

The foregoing preferred embodiment may be varied within the spirit and scope of the invention, the expression of which is set forth in the appended claims.

What is claimed is:

1. A system comprising: a central data station, a plurality of user stations, a communication link interconnecting said user stations with said central data station, each of said user stations including a usage database and means for accessing said central data station, said central data station including a data base of usage information and billing data, said central data station including means for accessing at least one of said user station's usage data base and for analyzing said user station's usage data to establish certain usage patterns, said central data station including means responsive to said user's usage pattern for calculating billing data, means for transmitting billing data to said user's station, said billing data including a billing plan based upon said usage pattern of said user.

2. The system of claim 1 wherein the billing plan is based upon current usage and projected usage calculated from said central data station data base in accordance with said user data base.

3. A communication system for processing information for distribution, comprising: a central data station, a plurality of user stations, a communication link interconnecting said user stations with said central data station, each of said user stations including a usage database and means for accessing said central data station, said central data station including a data base of usage information and billing data, said central data stations including means for accessing each of said user station's usage data to establish certain usage patterns, said central data station including means responsive to a user's usage pattern for calculating billing data, means for transmitting billing data to a user's station, said billing data including a billing plan based upon said usage pattern of said user and the projected usage calculated from said central data station data base in accordance with said user data base.

4. The system of claim 3, wherein each user station includes means for rejecting a billing plan transmitted to it by the central data station, means responsive to said rejection for initiating an on-line mode, and means responsive to termination of said on-line mode for retransmitting a second set of billing data.

5. The communication system of claim 3, wherein said means responsive to said user usage pattern for calculating a billing data including a billing plan comprises a central processing unit and a program memory connected to said central processing unit.

6. The communication system in claim 3, wherein said means for accessing the user station usage data base comprises a central processing unit and a multi-channel I/O device connected to an output of said central processing unit and capable of high speed data communication.

7. The communication system of claim 6, wherein said means responsive to said user pattern for calculating billing data including a billing plan comprises a central processing unit and a program memory connected to said central processing unit.

8. The communication system of claim 3, further comprising a central processing unit, a two-way telecommunications link to the U.S. Postal Service, whereby the U.S. Postal Service can monitor specific operations within said central data station to ensure that said central data station is operational in accordance with rules and requirements of the Postal Service.

9. The communication system of claim 8, wherein said central data station comprises means for inquiring of the Postal Service for specific information with regard to compliance with certifications, the answering of specific data questions, and other uses requiring specific interrogation by means of said central data station to the Postal Service.

10. The communication system of claim 9, wherein said input means comprises a keyboard.

11. A system for providing a plurality of mailers with the necessary equipment and services to carry out at a user's facility various mail processing functions, comprising:

(a) a central data station representing a supplier of mailing equipment and services and having a database of information representing equipment and service needs and costs thereof correlated to various mailer usage patterns, (b) a plurality of user stations at facilities for conducting local mail processing functions using equipment or services available from a supplier, (c) a communication link interconnecting each of said user stations with said central station, (d) each suer station having means for interrogating said central station via said link and in response to inquiries from said central station transmitting via said link to the central station its own mailer usage pattern and needs, (e) means at said central station in response to usage pattern information from a user station to create from its database and transmit via said link back to the user a billing plan customized to the usage pattern and user needs and providing for said billing necessary equipment or services to enable the user to carry out its required mail processing, (f) means at said central station for responding to the user's acceptance of the billing plan for providing to the user the mailing equipment or services pursuant to the billing plan and automatically billing the said user via said link in accordance with said accepted billing plan.

12. In a communication system for setting billing plans for a user facility from a central facility in accordance with a rate controlled information distribution arrangement, the method comprising the steps of:

electronically transmitting over a data link a past history to said central facility from said user facility;

electronically transmitting over a data link a future usage projection to said central facility from said user facility;

receiving at said user facility a projected billing program based on said usage data;

displaying said projected billing program to a user station operator for acceptance;

responding at said central facility to rejection of said billing program by recalculation and retransmission thereof; and responding at said central facility to acceptance thereof by entering same into said central data station for future billing.

13. In a communication system for setting billing plans for a user mailer facility from a central facility in accordance with the user's requirements for equipment or service from a supplier, the method comprising the steps of:

(a) establishing a communication link between the user and the central facility, (b) said central facility having a database of information representing needed equipment and services correlated to mailer usage patterns, (c) establishing a billing plan session with the central facility, (d) the user electronically transmitting over the communication link its mailer usage history to said central facility including future usage projection, (e) the central facility creating from its database a proposed billing plan based on said mailer usage history and transmitting said proposed billing plan to said user station for acceptance, (f) maintaining the billing plan session until the user accepts or terminates the session, (g) upon acceptance by the user, setting in motion the procedures for providing the accepting user with the equipment and services pursuant tot he accepted billing plan and storing the accepted billing plan for future billing of the user for said equipment and services.

* * * * *